US010614695B2

(12) United States Patent
Ostermann et al.

(10) Patent No.: US 10,614,695 B2
(45) Date of Patent: Apr. 7, 2020

(54) GAS-MEASURING DEVICE WITH PERSONNEL LOCATOR

(71) Applicant: Dräger Safety AG & Co. KGaA, Lübeck (DE)

(72) Inventors: Ulf Ostermann, Rümpel (DE); Livio Fornasiero, Bliestorf (DE); Oliver Harnack, Lübeck (DE); Winfried Schöch, Lübeck (DE); Wulf-Gerd Traving, Eutin (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 0 days.

(21) Appl. No.: 16/222,422

(22) Filed: Dec. 17, 2018

(65) Prior Publication Data

US 2019/0188988 A1 Jun. 20, 2019

(30) Foreign Application Priority Data

Dec. 18, 2017 (DE) .................. 10 2017 011 683

(51) Int. Cl.
*G08B 21/14* (2006.01)
*H04W 4/029* (2018.01)
(Continued)

(52) U.S. Cl.
CPC ......... *G08B 21/14* (2013.01); *G08B 21/0266* (2013.01); *G08B 21/16* (2013.01); *H04W 4/029* (2018.02); *G08B 21/023* (2013.01)

(58) Field of Classification Search
CPC .. G08B 21/023; G08B 21/0266; G08B 21/14; G08B 21/16; H04W 4/029
See application file for complete search history.

(56) References Cited

U.S. PATENT DOCUMENTS 7,640,026 B2 12/2009 Cameron
9,195,866 B1 11/2015 Mehranfar et al.
(Continued)

FOREIGN PATENT DOCUMENTS

AU 2015202280 A1 12/2015
DE 10 2006 034857 A1 1/2008
(Continued)

OTHER PUBLICATIONS https://www.accenture.com/us-en/success-marathon-teamed-acn-protects-employees-summary-video.
(Continued)

*Primary Examiner* — Sisay Yacob
(74) *Attorney, Agent, or Firm* — McGlew and Tuttle, P.C.

(57) ABSTRACT

A gas-measuring device includes a control unit, a gas sensor module, a radio receiver unit, a first radio transmitter unit and a second radio transmitter unit. The control unit detects sensor data via the gas sensor module in a first operating state and upon detecting a potential hazardous state, based on the sensor data, changes over into a second operating state. The control unit further detects one or more radio signals, which indicate respective characteristics of respective portable transmitter units, by the radio receiver unit in the second operating state, and determines, on the basis of the radio signals, which of the transmitter units have a sufficiently close proximity in space to the gas-measuring device. The control unit provides the characteristics of the transmitter units, having a sufficiently close proximity in space, via the first radio transmitter unit.

11 Claims, 7 Drawing Sheets

(51) Int. Cl.
*G08B 21/16* (2006.01)
*G08B 21/02* (2006.01)

(56) References Cited

U.S. PATENT DOCUMENTS

| | | | |
|---|---|---|---|
| 9,652,975 B1* | 5/2017 | Riley | A01K 15/022 |
| 2011/0260856 A1 | 10/2011 | Rossmann et al. | |
| 2013/0181617 A1* | 7/2013 | Maddox | H05B 37/0227 |
| | | | 315/159 |
| 2015/0010296 A1 | 1/2015 | Yasuda | |
| 2015/0248824 A1 | 9/2015 | Kamalakannan et al. | |
| 2017/0351923 A1 | 12/2017 | Rice, II et al. | |
| 2017/0352259 A1 | 12/2017 | Bruck et al. | |
| 2018/0075728 A1* | 3/2018 | Liu | H04W 4/029 |

FOREIGN PATENT DOCUMENTS

| | | |
|---|---|---|
| DE | 20 2008 005467 U1 | 8/2009 |
| DE | 10 2014 204 158 A1 | 9/2015 |
| WO | 2016/141582 A1 | 9/2016 |

OTHER PUBLICATIONS https://www.accenture.com/us-en/~/media/Accenture/Conversion-Assets/DotCom/Documents/Global/PDF/Industries_8/Accenture-Marathon-Teaming-Protect- Employees.pdf.
"Reporting method at the emergency assembly point," https://www/bgrci- foerderpreis.de/foerderpreis/beitrag.aspx?nr=1860.

* cited by examiner

GAS-MEASURING DEVICE WITH PERSONNEL LOCATOR

CROSS REFERENCE TO RELATED APPLICATIONS

This application claims the benefit of priority under 35 U.S.C. § 119 of German Application 10 2017 011 683.0, filed Dec. 18, 2017, the entire contents of which are incorporated herein by reference.

TECHNICAL FIELD

The present invention pertains to a gas-measuring device, having a control unit, a gas sensor module, a radio receiver unit, a first radio transmitter unit as well as a second radio transmitter unit.

BACKGROUND

Maintenance and repair work must be carried out in chemical and petrochemical plants at regular intervals. Persons who perform the work on site are subject to acute danger due to escaping gases and vapors in case of leaks or an accident. In addition to other protective gear, workers therefore carry, as a rule, gas-measuring devices with them, which generate an acoustic alarm if increased gas concentrations develop. Additional safety is offered by stationary or temporarily mounted, semi-stationary gas-measuring devices. The affected parts of the plant are evacuated in case of alarms. It may, however, happen in case of major accidents that evacuation is not possible in time and workers become unable to move due to poisoning or other effects.

Rescue workers now face the task of gaining an overview of the situation as quickly as possible and possibly to find persons who may have had an accident. However, since industrial plants are often highly complex and have a confusing arrangement, this may take a rather long time and accident victims may only be reached with a considerable delay.

SUMMARY

An object of the present invention is to make it possible to gain an overview of a situation in a short time and to find persons, e.g., workers or accident victims in a short time in an efficient manner.

An object of the present invention is therefore to provide a gas-measuring device, which is not only configured to detect a potential hazardous state in respect to possibly harmful gases, but is also able to support the location of persons in case of an accident or in a hazardous state.

Various processes and systems are known for locating workers in industrial plants and refineries.

Operation situation information systems in industrial pants now include mostly only the data of stationary sensor systems in an automated manner. Data of portable devices are not automatically taken into consideration. The location of workers is usually not determined. Therefore, very comprehensive verbal communication is necessary between all persons involved in the case of accidents in complex operation situations in order to obtain a picture of the situation. It may at times take hours under these circumstances to clarify the whereabouts of all workers.

Positioning systems in industrial areas are based on transmitters and receivers of radio signals. The person to be located either carries a transmitter with him/her and is located by a plurality of stationary receivers, or the person carries a receiver, which detects the signals of a plurality of transmitters having known positions. The calculation of the location is then carried out, for example, by measuring travel time differences of transmitted signals.

GPS (Global Positioning System), in which the person carries a receiver, which receives the satellite data, is a generally known positioning system. While positioning via GPS usually works reliably in open air, it is greatly disturbed in buildings or in areas with extensive metal installations because of the shielding or reflection of the radio signals, which occurs there, and it possibly leads to highly incorrect position calculations at best under these conditions.

Other solutions are so-called indoor location systems in industrial areas. These require the installation of a corresponding infrastructure of transmitters or receivers, but this may at times lead to high installation and maintenance costs in large industrial plants.

Furthermore, prior-art systems make it potentially possible to check the performance and behavior of a located person. The purchase of such a system may therefore be subject to the involvement of employee representatives.

For these reasons, person location systems have not yet become widespread so far in petrochemical industrial plants. According to the current state, workers are secured during hazardous activities by additional persons, so-called safety officers.

In particular, further sources, which propose different solutions in connection with the location of persons or workers, are known from the state of the art. These sources are:

Video of the installation of a person location system in a refinery of Marathon Petroleum Corporation in Robinson, Ill.:
https://www.accenture.com/us-en/success-marathon-teamed-acn-protects-employees-sum mary-video
https://www.accenture.com/us-en/~/media/Accenture/Conversion-Assets/DotCom/Documents/Global/PDF/Industries_8/Accenture-Marathon-Teaming-Protect-Employees.pdf
AU 2015202280 "System and method for voice based personalized interactive evacuation guidance"
US 2015 0248824 A1 "System and method for location tagged headcount accounting"
U.S. Pat. No. 7,640,026 B2 "Location of radio-frequency transceivers"
US 2015010296 A1 "System and method to monitor events and personal locations"
"Reporting method at the emergency assembly point," https://www/bgrci-foerderpreis.de/foerderpreis/beitrag.aspx?nr=1860.

The gas-measuring device according to the present invention comprises a control unit, a gas sensor module, a radio receiver unit, a first radio transmitter unit as well as a second radio transmitter unit, the control unit being configured to detect sensor data by means of the gas sensor module in a first operating state and to detect a potential hazardous state on the basis of the sensor data as well as to change over into a second operating state in case the hazardous state is detected, the control unit being further configured to detect one or more radio signals, which indicate respective characteristics of respective transmitter units that can be worn on a human body or on a piece of clothing, by means of the radio receiver unit in the second operating state, as well as to determine on the basis of the radio signals which of the transmitter units are located sufficiently close in space to the gas-measuring device, and to provide the characteristics of the transmitter units located in a sufficiently close proximity via the first radio transmitter unit.

The gas-measuring device according to the present invention can detect a potential hazardous state from sensor data of a gas sensor module, and further, in the presence of the potential hazardous state or in case of detection of such a state, can change over into a second operating state, in which a sufficiently close proximity of wearable transmitter units in space to the gas-measuring device can be detected, so that by providing this information or the characteristics of the transmitter units located in the sufficiently close proximity, a system or a user can then determine the location of the wearable transmitter units and the closeness of the wearable transmitter units to the gas-measuring device.

Such wearable transmitter units may consequently be worn by persons or workers, for example, on the clothing, so that the gas-measuring device can automatically provide information on transmitter units that are located in the proximity of the gas-measuring device in case of an accident or hazardous state. By providing such information, the locations of respective workers or respective persons can then be determined, for example, in a central unit. If, for example, different gas-measuring devices of the type according to the present invention are set up in case of application at so-called assembly points, which are intended for looking for persons in case of an accident or a hazard, it can then be determined in the central unit whether persons located in the plant or refinery as planned are located at such respective assembly points.

Due to the fact that the gas-measuring device according to the present invention preferably only detects the radio signals of the transmitter units in the second operating state and then determines a sufficiently close proximity in space of the transmitter units to the gas-measuring device and it sends such information in the second operating state only, energy or electricity may possibly be saved by the gas-measuring device, because switchover takes place from the first to the second operating state only when the hazardous state was detected on the basis of the sensor data of the gas sensor module, so that no analysis of radio signals needs preferably to be carried out during the first operating state.

A preferred embodiment of the gas-measuring device according to the present invention is configured such that the gas-measuring device further has an audio detection unit and/or an image detection unit, the control unit being further configured to detect audio data and/or image data by means of the audio detection unit in the presence of the second operating state and to provide them via the second radio transmitter unit.

A preferred embodiment of the gas-measuring device according to the present invention is configured such that the respective radio signals indicate respective transmission powers, with which the respective radio signals are transmitted, and wherein the control unit is further configured to determine on the basis of the indicated transmission powers which of the transmitter units have a sufficient proximity in space to the gas-measuring device.

A preferred embodiment of the gas-measuring device according to the present invention is configured such that the control unit is further configured to detect one or more radio signals, which indicate respective characteristics of wearable transmitter units, by means of the radio receiver unit at a first detection rate in the first operating state, as well as to detect one or more radio signals, which indicate respective characteristics of wearable transmitter units, at a second detection rate in the second operating state by means of the radio receiver unit, the second detection rate preferably being higher than the first detection rate.

A preferred embodiment of the gas-measuring device according to the present invention is configured such that the gas-measuring device further has a data module for receiving data messages, wherein the control unit is further configured to receive one or more data messages, which indicate additional sensor data of another, external gas sensor module, by means of the data module, and to detect the potential hazardous state on the basis of the additional sensor data.

A preferred embodiment of the gas-measuring device according to the present invention is configured such that the gas-measuring device further has a data module for receiving data messages, the control unit being further configured to receive by means of the data module at least one alarm message, which indicates the possible presence of a hazardous state, and to detect the potential hazardous state on the basis of the alarm message.

A preferred embodiment of the gas-measuring device according to the present invention is configured such that the gas-measuring device further has an interface to an audio signal detection unit, wherein the control unit is further configured to detect audio data by means of the interface, to detect the presence of a predefined acoustic signal on the basis of the audio data, and to detect the potential hazardous state in the presence of the predefined acoustic signal.

A preferred embodiment of the gas-measuring device according to the present invention is configured such that the gas-measuring device further has a data module for receiving data messages, the control unit being further configured to receive an acknowledge message by means of the data module in the second operating state and to end the second operating state in the presence of the acknowledge message.

A preferred embodiment of the gas-measuring device according to the present invention is configured such that the gas-measuring device further has an input unit for receiving a predefined user input, the control unit being further configured to end the second operating state in the presence of the predefined user input.

The present invention will be explained in more detail below on the basis of special embodiments on the basis of the figures without limitation of the general inventive concepts. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
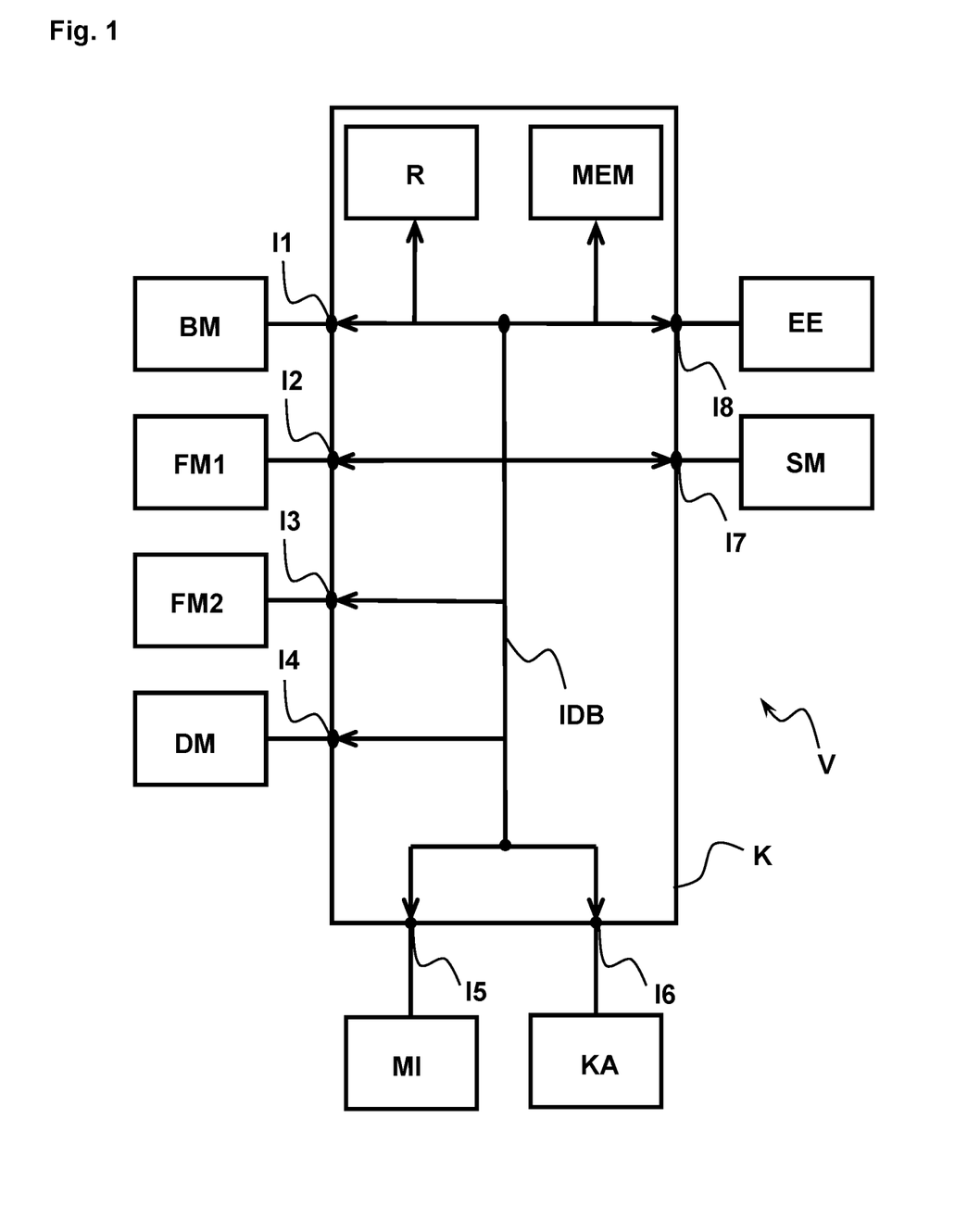
FIG. 1 is a schematic view showing a preferred embodiment of the device according to the present invention.

Referring to the drawings, FIG. 1 shows a preferred embodiment of the device or gas-measuring device V according to the present invention.

The gas-measuring device V has a control unit K, which preferably has a computer R as well as a memory unit MEM.

The control unit K has an interface I1 to a radio receiver unit BM, which is preferably a so-called Bluetooth Low-Energy (BLE) unit or a Bluetooth Low-Energy receiver.

The control unit K further has an interface I2 to a radio transmitter unit FM1.

The control unit K further has an interface I3 to a second radio transmitter unit FM2.

The control unit K further has an interface I7 to a gas sensor module SM.

The control unit K preferably has an interface I4 to a data communication module or data module DM.

The data module MD makes possible a data communication in a wired or wireless manner, wherein a wireless data communication may be implemented in the form of a radio technology.

The control unit K preferably has, in addition, an interface I5 to an audio detection unit MI, preferably in the form of a microphone. Further, the control unit K preferably has an interface I to an image detection unit KA, preferably in the form of a camera.

Further, the control unit K preferably has an interface I8 to an input unit EE. The input unit may be a button, a touch screen or another similar input unit for receiving an input signal of a user.

The interfaces I1, . . . , I8 may each be wired or wireless interfaces.

The interfaces I1, . . . , I8 are preferably connected to the computer R and/or to a memory unit MEM of the control unit K via an internal data bus IDB.

The first radio transmitter unit FM1 preferably has a lower power consumption than the second radio transmitter unit FM2.

The first radio transmitter unit FM1 preferably has a lower data rate than the second radio transmitter unit FM2.

The first radio transmitter unit FM1 is preferably a radio transmitter unit according to the LoRa standard, the Sigfox standard, the LTE-M standard or the NB-IoT standard.

The second radio transmitter unit FM2 is preferably a radio transmitter unit according to the WLAN standard or the LTE standard or another mobile phone network standard.

The data module DM is preferably a data module for data communication in a wireless manner according to the WLAN standard or the LTE standard. The data module DM is preferably a data module for data communication in a wired manner according to the WLAN standard under another Internet protocol.

The radio receiver unit BM is preferably configured according to the standard according to the Bluetooth Core Specification V5.0, Covered Core Package Version: 5.0, Publication date Dec. 6, 2016.

An essential idea of the present invention is that after detection of the hazardous state, the device according to the present invention can change over into a second operating state, in which the radio receiver unit BM, preferably as a BLE module, can receive signals, preferably in the form of so-called BLE beacons, from portable transmitter units. Such portable transmitter units may be worn by persons or workers on their clothing. The radio receiver unit BM is, for example, a so-called Bluetooth Low-Energy scanner in this case.

The device V according to the present invention with such a receiver unit BM may now be set up preferably stationarily at locations that may be significant in case of an evacuation. Such locations may be so-called assembly points.

The location at which the device V is set up may preferably also be a location at which potentially hazardous work is performed by workers. If the hazard is then detected, the device V according to the present invention can then determine in the second operating state which transmitter units or which corresponding workers are located in the proximity of the device V and it can transmit this information to a central unit. The central unit can then determine, for example, which persons are located in the proximity of the device V and hence within a hazardous area.

A radio signal may be a so-called BLE beacon signal, which is sent regularly or periodically by such a transmitter unit or by portable transmitter units.

Among others, a transmission strength is preferably also transmitted in a coded form in a radio signal, for example, a BLE beacon signal, or it is indicated by the radio signal, This makes it possible to read the transmission strength at the location of the transmitter from a radio signal and, taking into account a determined reception strength of the radio signal in the receiver unit BM as well as the transmission strength indicated in the radio signal, to determine the distance between the device V and the transmitter unit, which has sent the radio signal. As a result, it can then be determined whether a transmitter unit, which has transmitted the radio signal, is located in a sufficiently close proximity of the device V.

Figure 2:
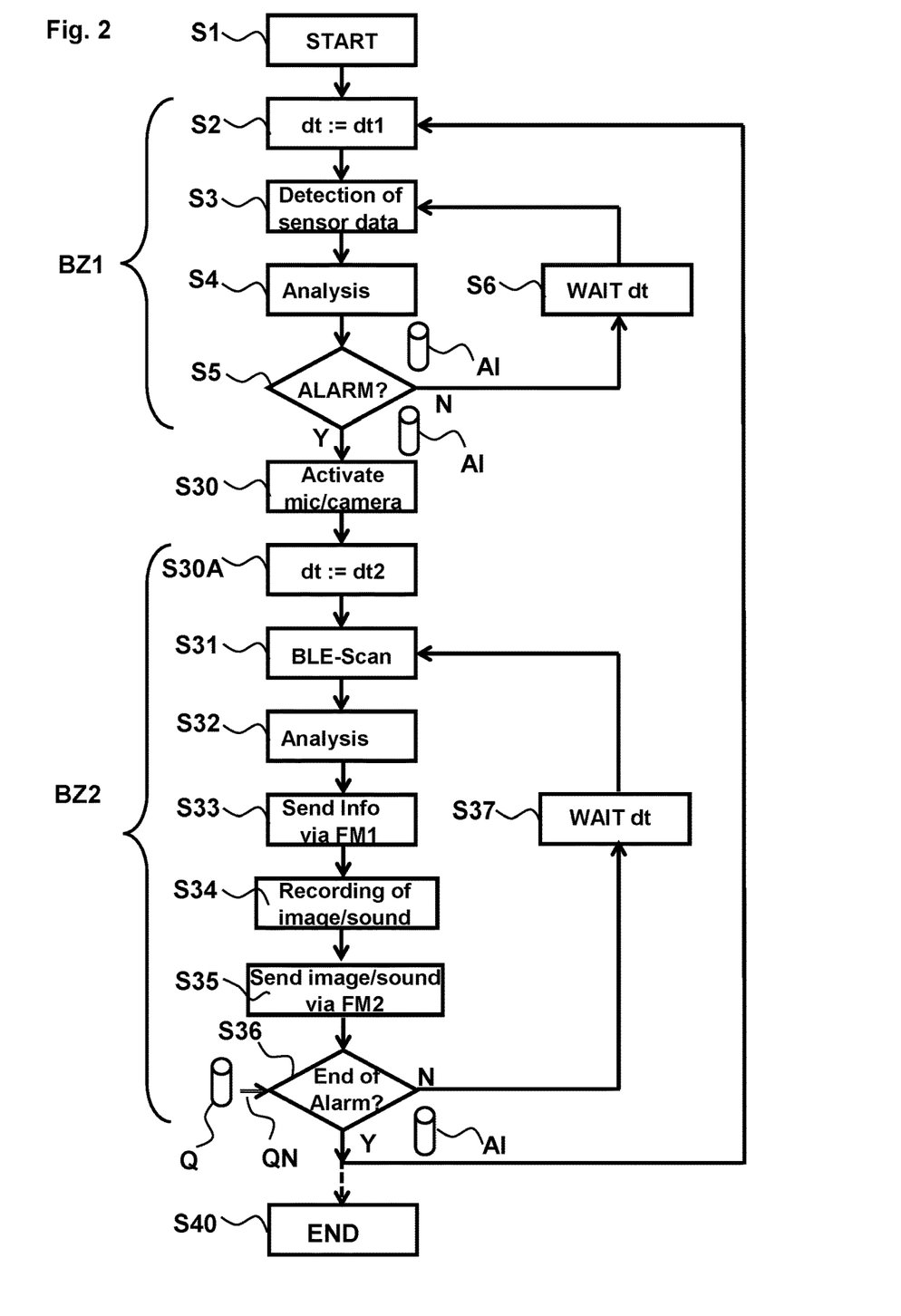
FIG. 2 is a flow diagram showing process steps, which illustrate the mode of operation of the device according to the present invention.

FIG. 2 shows process steps that can be carried out by the device according to the present invention.

These are process steps that pertain essentially to the mode of operation of the control unit K.

The process begins in a first process step S1.

A time interval dt is set in a second process step S2 at a predefined value dt1, which is preferably stored in a memory unit MEM from FIG. 1.

Sensor data of the gas sensor module SM from FIG. 1 are detected in a third process step S3.

An analysis of these sensor data is then carried out in a process step S4. A maximum, a mean value, a median value and/or other values derived from the raw sensor data are preferably determined here. A potential hazardous state in the area surrounding the device V is then determined or the potential hazardous state is detected on the basis of the raw sensor data. The goal is consequently to detect a potential hazardous state in the area surrounding the device V in the first operating state BZ1.

A potential hazardous state is detected, for example, when the raw sensor data or a value derived therefrom exceeds a predefined threshold valve once or continuously during a predefined time window.

An alarm information AI, which indicates whether the potential hazardous state was detected, is then consequently generated in a process step S4. The alarm information may assume, for example, the value 0 in order to indicate that no hazardous state was detected, or a value 1, in order to indicate that the potential hazardous state was detected.

This alarm information is then passed on to a process step S5. A decision is then made in process step S5 on whether the case of alarm or the potential hazardous state is present.

If this is not present (N), so that the alarm information AI consequently assumes the value 0, the process is branched off to a step S6 within the operating state BZ1, in which step there is a waiting over the time interval dt. After waiting over the time interval dt, the process returns from the process step S6 to the process step S3.

If the potential hazardous state was detected (Y), so that the alarm information has consequently assumed the value 1, the process is branched off further to process steps within the second operating state BZ2, and the process is then consequently changed over into the second operating state BZ2.

The audio detection unit MI from FIG. 1, which is preferably present, is preferably activated in a then following process step S30. Furthermore, the image detection unit KA, which is described in FIG. 1 and is preferably present, is activated.

The time interval for waiting dt is set at another value dt2 in the process step S30A. The time value dt2 is preferably lower than the time value dt1. Radio signals of portable transmitter units are then received in process step S31. This may also be described as a so-called BLE scan. The respective radio signals received within the framework of the process step S31 indicate respective characteristics of respective portable transmitter units.

An analysis of the radio signal is then carried out in process step S32 following the detection of the radio signals in process step S31.

This will be described in detail below with reference to FIG. 3.

It is determined in process step S32 on the basis of the radio signals which of the corresponding transmitter units have a sufficiently close proximity in space to the gas-measuring device V from FIG. 1.

The characteristics of the transmitter units for which sufficiently close proximity in space to the gas-measuring device was determined are then sent in process step S33. This transmission of the characteristics may also be considered to be the provision of these characteristics. A distance of a transmitter unit is preferably determined in process step S32 on the basis of the corresponding radio signal of the transmitter unit to the gas-measuring device. Such distance information relative to the respective transmitter units is then preferably provided within the framework of process step S33.

The gas-measuring device preferably provides the sensor data of the gas sensor module SM from FIG. 1 or values derived therefrom in process step S33.

Information or data are provided in process step S33 via the first radio transmitter unit FM1 from FIG. 1.

Audio data and/or image data are detected in process step S34 via the image detection unit KA, which is preferably present, or via the audio detection unit MI from FIG. 1, which is preferably present.

Such audio and image data may be related to a spatial area surrounding the gas-measuring device V.

The audio data and/or image data are then provided via the second radio transmitter unit FM2 from FIG. 1 in process step S35.

The transmission of the characteristics of the transmitter units, which are located in a sufficiently close proximity of the gas-measuring device, is a highly critical information, which must be provided or transmitted with high priority, for example, to a central unit. Even though the image and/or audio data, which are transmitted by means of the second radio transmitter unit FM2, may also be used in the central unit for display or analysis, they only represent additional information, which shall have a lower priority compared to characteristics of the transmitter units. The second radio transmitter unit FM2 may therefore operate, for example, according to a mobile phone network standard, such as the LTE standard, which can provide higher data rates than, for example, the radio transmitter unit FM1 according to the LoRa standard or the Sigfox standard, but precisely such a transmission via the second radio transmitter unit FM2 by means of, for example, the LTE technology is less robust than a data transmission via the first radio transmitter unit FM1 by means of, for example, the LoRa standard. Consequently, the solution being mentioned and proposed here is therefore advantageous, because the importance and the priority of the information are ensured when different radio transmitter units FM1, FM2 are used for different types of information with different priorities of transmission and provision.

It can then be decided in a process step S36 whether the potential hazardous state may have possibly ceased to exist. This may be the case (Y), for example, when an acknowledge message QN, which indicates with a corresponding data element Q that no potential hazardous state is present any more, was received via the data module DM. This may be, for example, a corresponding acknowledge message QN from a central unit, which would like to reset a gas-measuring device V from FIG. 1 back into the first operating state BZ1.

The alarm information AI is then consequently reset again to 0.

It is thus possible to return to process step S2 from process step S36 in case an acknowledge message QN is present.

As an alternative, the entire process can be ended by branching off to a process step S40 as a final process step.

If the hazardous state continues to be present (N), the process is branched off from process step S36 to a process step S37, in which there is a waiting over the time interval dt. Due to the waiting time dt having been set at the value dt2 in process step S30A, the waiting time is shorter than in process step S6 of the first operating state BZ1. The duration dt2 is simply shorter than the duration dt1.

Figure 3:
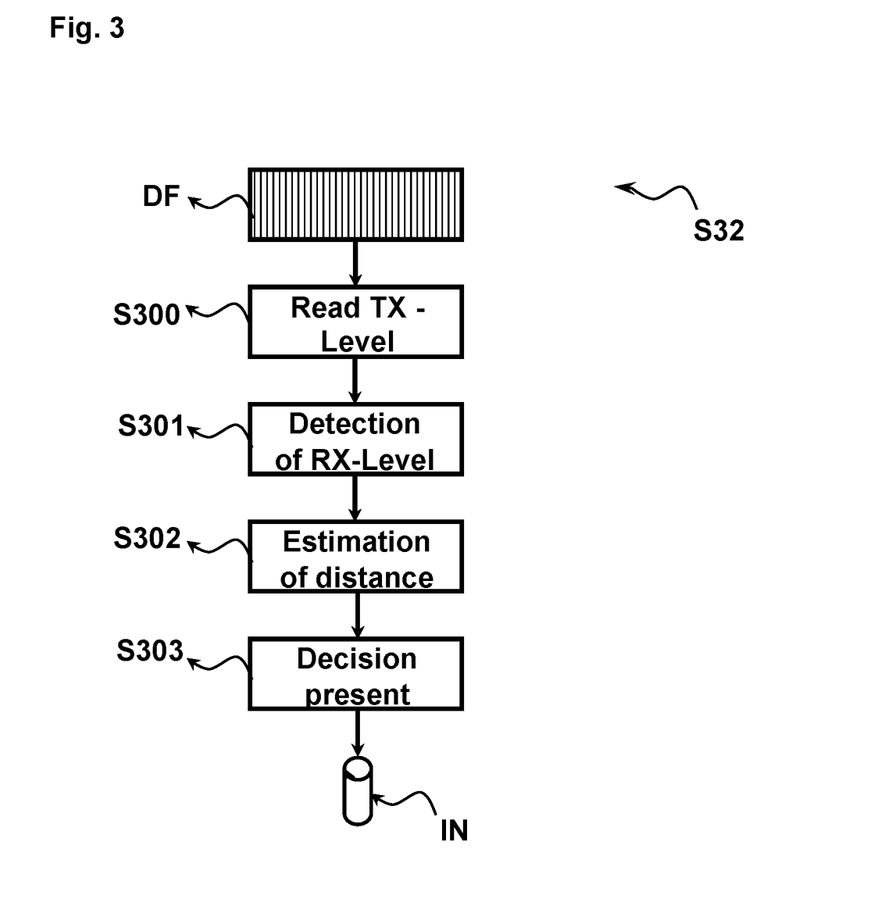
FIG. 3 is a flow diagram showing partial process steps for analyzing received radio signals.

FIG. 3 shows in detail the partial process steps for the process step S32 for the analysis of radio signals from FIG. 2. It shall be assumed that a radio signal of a portable transmitter unit indicates a plurality of data fields DF. A certain data field, which indicates a transmission power during the transmission of the corresponding radio signal, can then be read in a first partial step S300. A so-called TX Power Field can be read for this, for example, according to the Bluetooth Core Specification 5.0 standard, p. 2585, Chapter 2.3.4.7, in order to determine the transmission power, with which the radio signal was transmitted. In other words, it is assumed that the respective radio signals indicate respective transmission powers, with which the respective radio signals were transmitted.

It will now be described how it can be determined on the basis of the indicated transmission power whether the corresponding transmitter unit, which has transmitted the corresponding radio signal, has a sufficiently close proximity in space to the gas-measuring device V from FIG. 1.

Using the radio receiver module BM, a reception power present during the reception of the corresponding radio signal is then determined in a process step S301.

A distance, which shall be the distance between the corresponding transmitter unit and the gas-measuring device V, is then estimated or determined in a process step S302 on the basis of the indicated transmission power and the previously determined reception power.

It can then also be decided, for example, in a process step S303, using a so-called threshold value, whether the estimated or determined distance from process step S302 indicates that the corresponding transmitter unit had a sufficient proximity in space to the gas-measuring device V at the moment of the transmission or reception of the corresponding radio signal.

The radio signal or a corresponding data field DF further indicates a characteristic of the respective portable transmitter unit, which sent the radio signal.

Characteristics of the corresponding transmitter units, for which a sufficiently close proximity in space to the gas-measuring device V from FIG. 1 was determined in process step S303, can then be determined in a data field IN.

Figure 5:
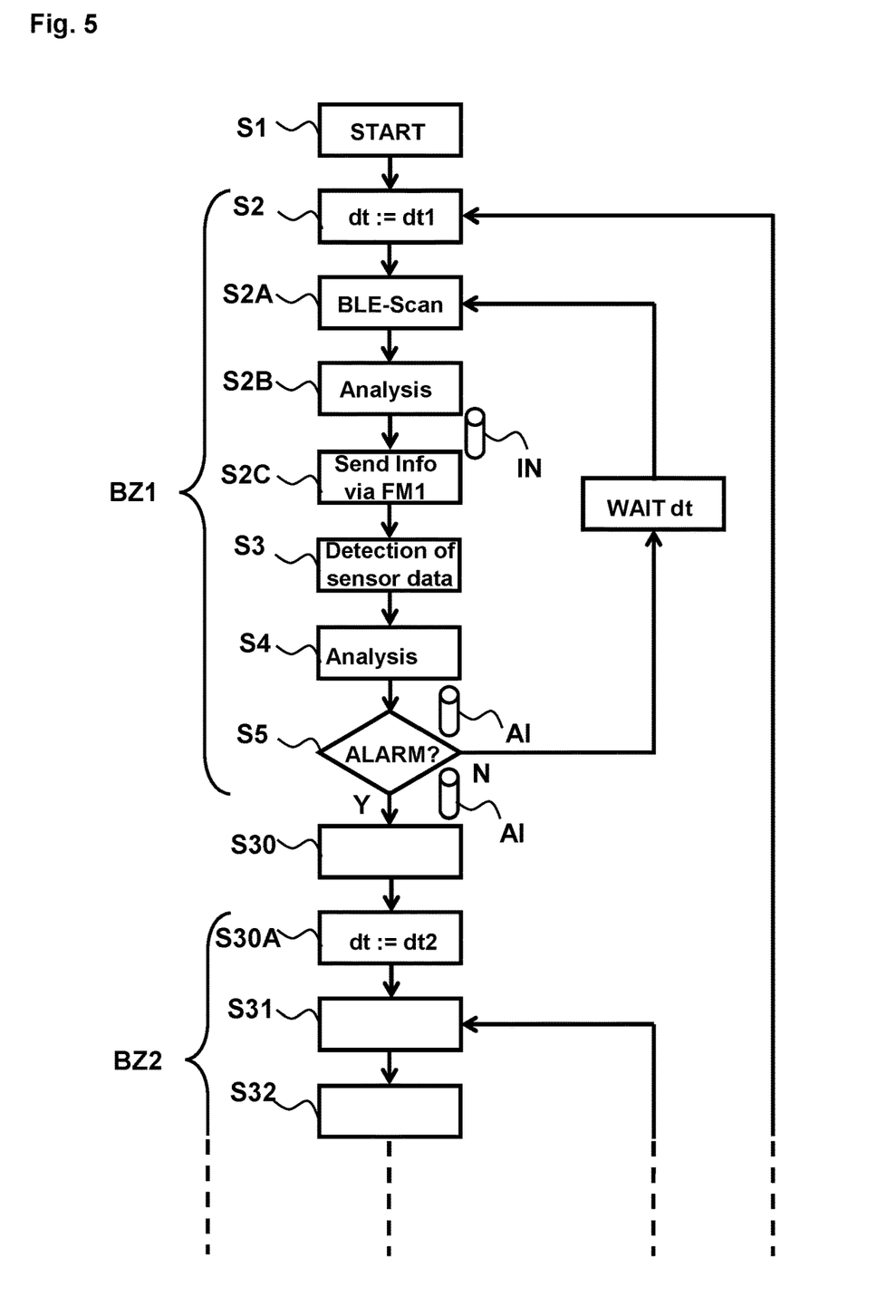
FIG. 5 is a flow diagram showing preferred process steps to be carried out by a preferred embodiment of the device according to the present invention.

FIG. 5 shows a preferred embodiment of preferred partial steps in a preferred variant of the first operating state BZ1. Now, radio signals are received or a BLE scan is performed, as was previously described with reference to process step S31, in the first operating state BZ1 following the process step S2.

An analysis of the radio signals is then performed in process step S2B analogously to the process step S32 from FIG. 2 and as was explained before in detail with reference to FIG. 3.

Characteristics of transmitter units for which a sufficient proximity or a sufficient proximity in space to the gas-measuring device V was determined are then provided and sent in process step S2C.

This transmission of information takes place in process step S2C analogously to the process step S33 from FIG. 2.

Further process steps S3, etc. will then follow, as was described with reference to FIG. 2.

In particular, there is a waiting over the time interval dt, which was set at the value dt1 based on process step S2, within the process step S6 in the first operating state BZ1.

As it was just described above, there is a waiting over the time interval dt2, which was set at the value dt2 based on the process step S30A, within the process step S37 in the second operating state BZ2.

Since the time interval dt1 is preferably longer than the time interval dt2, there is waiting over a longer period in process step S6 than in the process step S37. Radio signals (BS) are thus preferably detected with a lower detection rate in the first operating state BZ1 than in the second operating state (BZ2).

Detection of radio signals is performed in this embodiment according to FIG. 5 both in the first operating state BZ1, namely, in process step S2B, and in the second operating state BZ2, namely, in process step S31.

Based on the aforementioned selection of the values for the time intervals dt1 as well as dt2, it can consequently be determined that radio signals which indicate respective characteristics of portable transmitter units are detected at a first detection rate in the first operating state by means of the radio receiver unit BM, and radio signals which indicate respective characteristics of portable transmitter units are detected at a second detection rate by means of the radio transmitter unit BM in the second operating state BZ2. The second detection rate is preferably higher than the first detection rate. As an alternative, the second detection rate may preferably be equal to the first detection rate.

In case the second detection rate is higher than the first detection rate, the advantage arises that the first operating state BZ1 can be considered to be a so-called sleep mode, in which characteristics are detected only with a low detection rate, and these characteristics are then provided via the radio transmitter unit FM1, which may be sufficient in case there is no hazard and it saves energy compared to the second operating state BZ2. The second operating state BZ2 shall be just such a state, in which it was already detected before that a hazardous situation is present, so that radio signals with the respective characteristics of portable transmitter units shall also be detected now at a higher rate in order to also transmit and provide the corresponding characteristics at a higher rate via the first radio transmitter unit FM1.

It is ensured hereby that corresponding information on a sufficiently close proximity in space of portable transmitter units or of the users/workers who wear them to the gas-measuring device V is also transmitted and provided more often and at a higher rate in case of a hazardous situation, i.e., in case of the second operating state BZ2.

Figure 4:
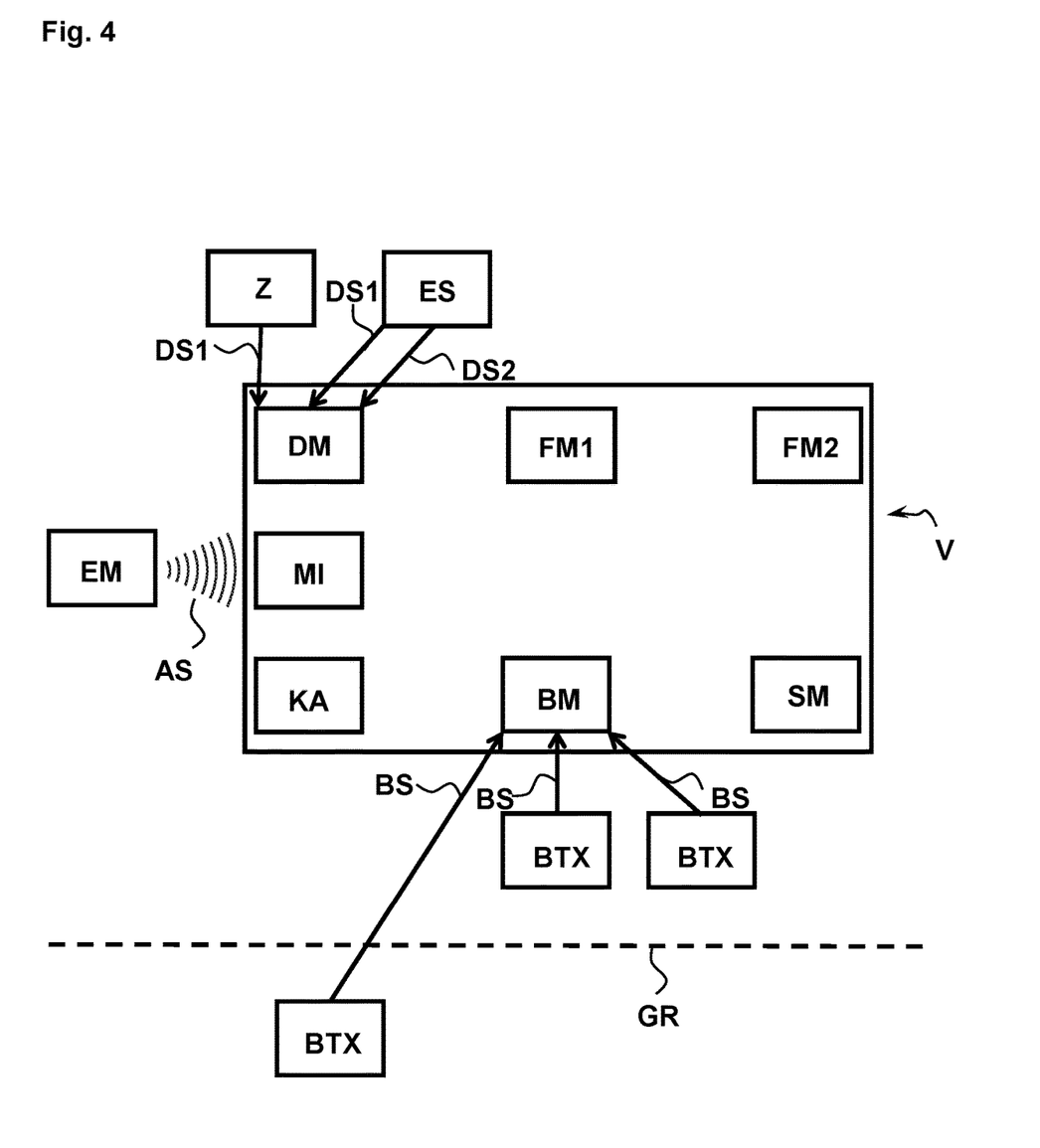
FIG. 4 is a schematic view showing a system overview of a system, in which the device according to the present invention can be used.

FIG. 4 shows a system overview, in which the device V can be used.

Portable transmitter units BTX transmit radio signals BS to the radio receiver unit BM of the device V.

The device V can then analyze the radio signals BS on the basis of the control unit K in the above-described manner and provide the above-described information via the radio transmitter units FM1, FM2.

It may happen, for example, that a sufficient proximity in space is only assumed for transmitter units BTX for which it is true that they are located within an imaginary borderline GR in the proximity of the device V. According to the example in FIG. 4, this is true for only two transmitter units BTX, but not for the transmitter unit BTX that is located beyond the imaginary distance limit GR.

It is further conceivable that an external gas-measuring device EM is present, which emits an acoustic signal AS in case of an alarm or a hazardous situation. Such a signal AS can then be detected, for example, by the microphone or the audio detection unit MI and analyzed by the control unit K.

It is further possible that an external sensor unit ES is present, which transmits sensor values of the external sensor unit ES via a data signal DS2 to the data module DM by means of the data signal DS2.

The external sensor unit ES preferably has a transmitter unit BTX of its own.

Further, it is possible that the external sensor unit itself has an alarm generation function, so that this can transmit information on the presence of a case of alarm generation or of a hazardous state to the data module DM by means of a data signal DS1. Further, it is likewise possible that an alarm information concerning the presence of an alarm generation situation or of a hazardous state is transmitted to the data module DM from a central unit Z by means of just such a data signal DS1.

How the device V or its control unit K can detect a hazardous situation or a hazardous state differently will now be described with reference to FIG. 6.

Figure 6:
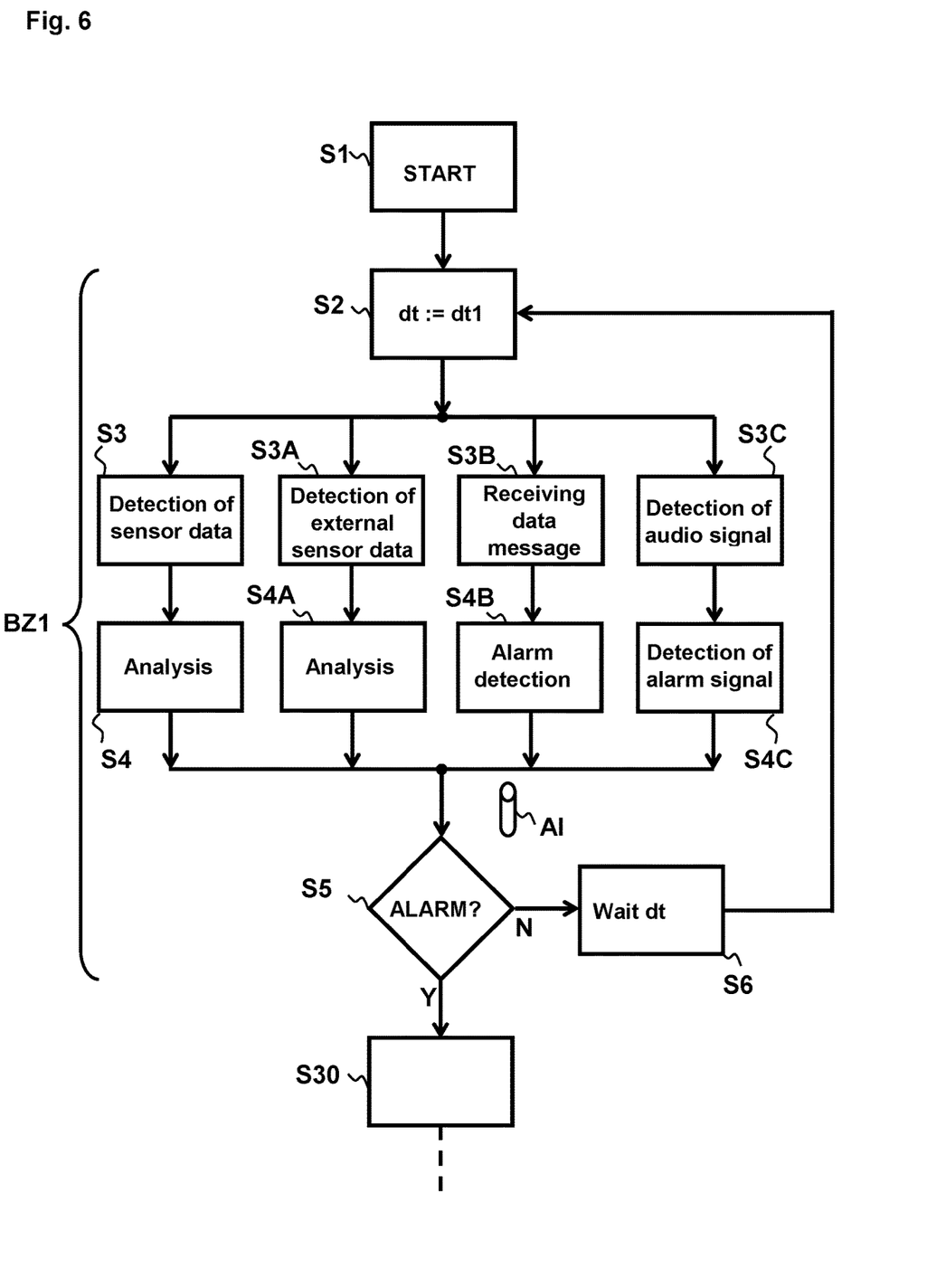
FIG. 6 is a flow diagram showing further preferred process steps for detecting a hazardous state by the device according to the present invention.

FIG. 6 shows the process step S1 mentioned before with reference to FIGS. 2 and 5.

The above-mentioned process step S2, in which the time interval is set at the value dt1, follows now.

The hazardous state can be detected according to the process steps S3 as well as S4, which are shown in the left-hand area and which were already described before with reference to FIG. 2, in order to generate corresponding alarm information AI.

In addition to this possibility of detecting a hazardous state, an additional possibility arises for detecting the hazardous state.

Simultaneously with the process steps S3 and S4, process steps S3A and S4A take place, wherein sensor data are received by means of the aforementioned data signal DS2 via the data module DM in process step S3A and they are then analyzed analogously to the process step S4 in the process step S4A in order to detect a potential hazardous state.

It is consequently possible that one or more data messages DS2, which indicate additional sensor data of an additional, external gas sensor module ES, see FIG. 4, are received by means of the data module DM from FIG. 1, so that the potential hazardous state is detected on the basis of the additional sensor data.

The process steps S3B and S4B show an additional possibility of detecting the hazardous state.

For example, a data signal DS1 from FIG. 4, which signal indicates the presence of an alarm, can be received in process step S3B. The data signal DS1 is an alarm message. This alarm message DS1 can be received by a central unit Z or an external sensor unit ES.

The potential hazardous state can then be detected in process step S4B on the basis of the alarm message DS1.

The process steps S3C as well as S4C show an additional possibility of detecting a hazardous state. Audio data are detected here by means of the audio detection unit MI in process step S3C.

The presence of a predefined acoustic signal or signal pattern is then detected in process step S4C on the basis of these detected audio data. Such a signal pattern may have been stored in the memory unit MEM of the device V from FIG. 1 and may be provided by the memory unit MEM.

If it is detected that the predefined acoustic signal or the predefined acoustic signal pattern is present, the potential hazardous state is then detected.

FIG. 6 shows an embodiment of the first operating state BZ1, in which the four different manners of detecting the hazardous state can all be carried out simultaneously with one another. It is obvious for a person skilled in the art that only one or more of these manners of analysis can be implemented.

Further, it is possible for a person skilled in the art to combine one or more configurations, which were described with reference to FIG. 6, in combination with configurations that were described with reference to FIG. 5.

According to FIG. 2, an acknowledge message QN can be received in process step S36 and the second operating state BZ2 can be ended in the presence of this acknowledge message QN.

In the case in which the device V from FIG. 1 has an input unit EE for receiving a user input, the control unit K may end the second operating state BZ2 in case a predefined user input that is received by the input unit EE. The predefined user input may be, for example, a certain swipe pattern or a predefined swipe gesture, which has been stored in the memory unit MEM from FIG. 1. The predefined user input may also consist of the input unit EE being a button or a key, which was pressed by a user.

In summary, it can be stated that the control unit is further preferably configured to detect one or more radio signals, which represent respective portable transmitter units, at a first detection rate by means of the radio receiver unit in the first operating state, as well as to determine, based on the radio signals, which of the transmitter units are located in a sufficiently close proximity in space of the gas-measuring device and to transmit the characteristics of the transmitter units located in a sufficiently close proximity in space via the first radio transmitter unit at a first transmission rate. The control unit is further preferably configured to detect one or more radio signals, which indicate respective characteristics of portable transmitter units, at a second detection rate by means of the radio receiver unit in the second operating state, as well as to determine based on the radio signals which of the transmitter units are located in a sufficiently close proximity in space to the gas-measuring device and to transmit the characteristics of the transmitter units located in a sufficiently close proximity in space at a second transmission rate via the first radio transmitter unit (FM1), wherein the second detection rate is preferably higher than the first detection rate.

Figure 7:
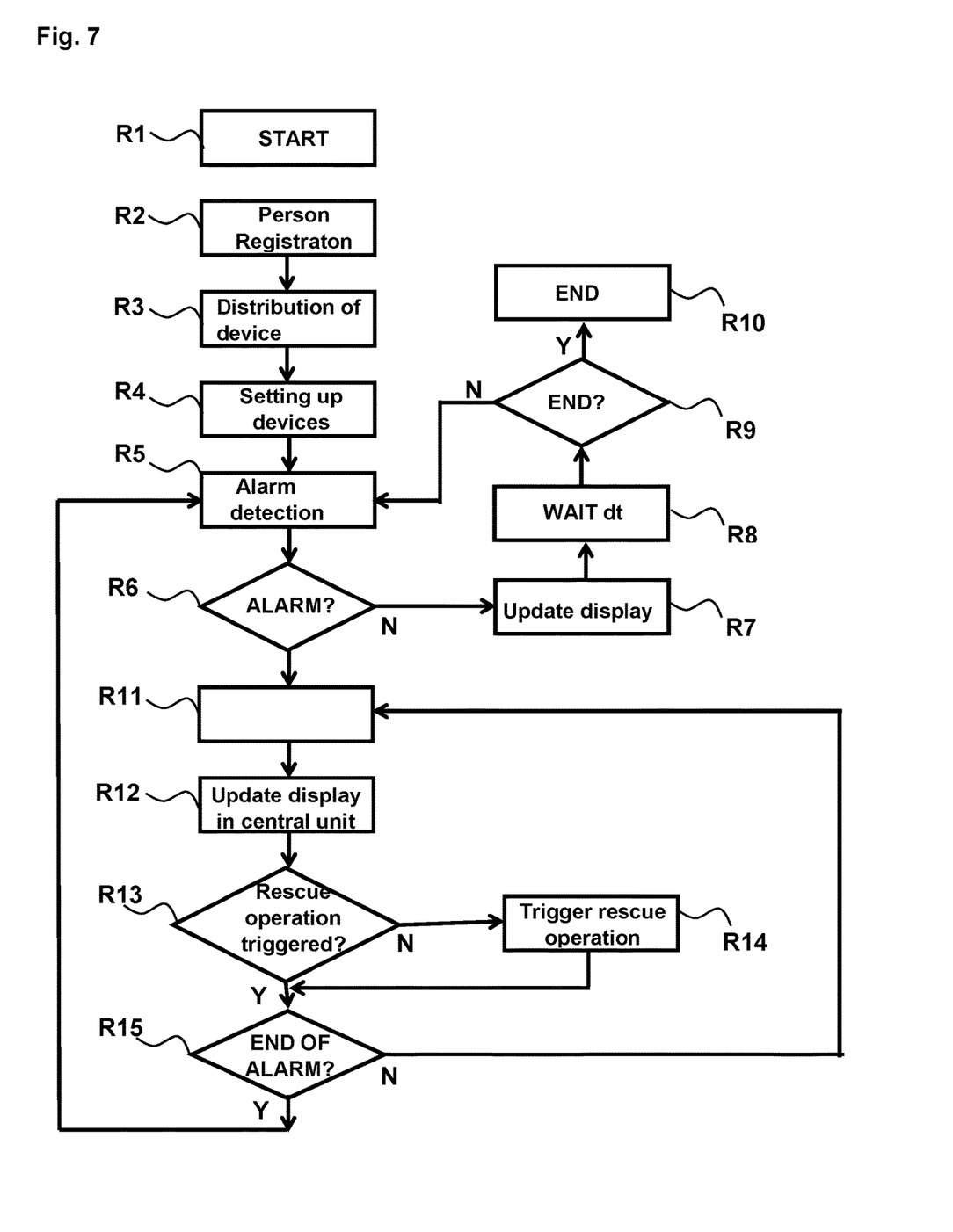
FIG. 7 is a flow diagram for describing a scenario, in which the device according to the present invention can be used.

FIG. 7 shows a sequence of steps of a scenario in which the device V according to the present invention can be used.

A sequence of the scenario begins in a first step R1.

In a first step R2, persons may be registered, for example, at a central unit, so that devices and portable transmitter units are then assigned in a step R3 to the respective persons and are distributed to these persons. A data set for assigning names of persons to characteristics of devices or to portable transmitter units can then consequently be present in this central unit.

The device according to the present invention or a plurality of devices according to the present invention can then be set up at corresponding locations in a step R4.

A location can be registered in the process by location data that indicate the respective positions or locations of the respective devices being tracked in the central unit.

Such location information can preferably be obtained by a gas-measuring device having a GPS, which generates location data, and by the corresponding location data of the corresponding devices then being transmitted to the central unit.

Step R5 represents essentially the first operating state BZ1 from the above-mentioned figures, in which state an alarm detection may be carried out.

If such an alarm situation is then detected according to step R6, the process can be branched off to a step R11, which represents the steps S30 through S35 according to the above figures.

An update of displays of information, which has just been obtained from the gas-measuring devices according to the present invention, may be carried out in a control room of the central unit in a step R12. The information may be information related to the presence of portable transmitter units or workers at certain locations.

It may be checked in a step R13 whether a rescue operation was already triggered. If not, the process is branched off to a step R14, in which a rescue operation is triggered.

If a rescue operation has already been triggered, the process is branched off from step R13 to a step R15, which corresponds essentially to process step S36 from FIG. 2.

If the hazardous situation and the alarm end, the process returns to step R5.

If the alarm or the hazardous situation failed to come to an end, the process returns to step R11.

If it was decided in step R6 that there is no alarm situation or hazardous situation, the process may be branched off to a step R7, in which an update of a status display may be carried out in a central unit in order to display up-to-date data relative to the presence of portable transmitter units or of the users/workers in case of measuring devices.

A next step R8 corresponds essentially to step S6 from FIG. 2, 5 or 6, in which there is a waiting over a predefined duration dt.

It is decided in step R9 whether or not the general monitoring or the monitoring of an area in space by gas-measuring devices according to the present invention shall be ended.

If not, the process is branched off back to a process step R5. If this happens, the process is branched off from process step R9 to a process step R10, in which the process is ended.

The exemplary embodiments being described here shall not be considered to represent a limitation of the present invention. Additions and modifications are possible, especially those that the person skilled in the art can find in respect to accomplishing the object, for example, by combining or modifying individual features or process steps that are described in conjunction with the general or special part of the description as well as are contained in the claims and/or in the drawings and that lead by combinable features to a new object or to new process steps or sequences of process steps.

Depending on defined implementation requirements the hardware and software implementation may be carried out with the use of a digital storage medium (MEM), for example, a floppy disk, a DVD, a Blu-Ray disc, a CD, a ROM, a PROM, an EPROM, an EEPROM or a FLASH memory, a hard drive or another magnetic or optical memory, on which electronically readable control signals are stored, which can or do interact with a programmable hardware component such that the process in question is executed.

A programmable hardware component, for example, the control unit K mentioned here and/or the computer R mentioned here, may be formed by a processor, a computer processor (CPU=Central Processing Unit), a graphics processor (GPU=Graphics Processing Unit), a computer, a computer system, an application-specific integrated circuit (ASIC=Application-Specific Integrated Circuit), an integrated circuit (IC=Integrated Circuit), a system-on-chip system (SOC=System on Chip), a programmable logic element or a field-programmable gate array with a microprocessor (FPGA=Field Programmable Gate Array).

The digital storage medium (MEM) may therefore be machine- or computer-readable. Some exemplary embodiments consequently comprise a data storage medium, which has electronically readable control signals, which are capable of interacting with a programmable computer system or with a programmable hardware component such that one of the processes being described here is executed. An exemplary embodiment is consequently a data storage medium (or a digital storage medium or a computer-readable medium), on which the program for executing one of the processes being described here is recorded.

Depending on defined implementation requirements the hardware and software implementation may be carried out as a program, firmware, computer program or computer program product with a program code or as data, wherein the program code or the data act such as to execute one of the processes when the program is running on a processor or on a programmable hardware component. The program code or the data may also be stored, for example, on a machine-readable medium or data storage medium. The program code or the data may be present, among other things, as source code, machine code or byte code as well as as other intermediate code.

A program according to an exemplary embodiment may implement the mode of operation being described here, e.g., in the form of one of the processes while the program is being executed, for example, by the program reading storage locations or by writing a datum or a plurality of data into these storage locations, as a result of which switching operations or other operations are possibly elicited in transistor structures, in amplifier structures or in other electrical, optical, magnetic components or components operating according to another principle of function. Data, values, sensor values or other information can correspondingly be detected, determined or measured by a program by reading a storage location. A program can therefore detect, determine or measure variables, values, measured variables and other information by reading one or more storage locations as well as effect, prompt or execute an action as well as actuate other devices, machines and components by writing to one or more storage locations.

While specific embodiments of the invention have been shown and described in detail to illustrate the application of the principles of the invention, it will be understood that the invention may be embodied otherwise without departing from such principles.

APPENDIX

List of reference designations:

| | |
|---|---|
| AI | Alarm information |
| AS | Acoustic signal |
| BM | Radio receiver unit |
| BS | Radio signals |
| BTX | Transmitter units |
| BZ1 | First operating state |
| BZ2 | Second operating state |
| DF | Data fields |
| DM | Data module |
| DS1 | Data signal |
| DS2 | Data signal |
| dt | Time interval |
| dt1 | Time value |
| dt2 | Time value |
| EE | Input unit |
| EE | Input unit |
| EM | External gas-measuring device |
| ES | External sensor unit |
| FM1 | First radio transmitter unit |
| FM2 | Second radio transmitter unit |
| GR | Borderline |
| I | Interface |
| I1 | Interface |
| I2 | Interface |
| I3 | Interface |
| I4 | Interface |
| I5 | Interface |
| I7 | Interface |
| I8 | Interface |
| IDB | Internal data bank |
| IN | Data element |
| K | Control unit |
| KA | Image detection unit |
| MEM | Memory unit |
| MI | Audio detection unit |
| Q | Data element |
| QN | Acknowledge message |
| R | Computer |
| R1 | Step |
| R10 | Step |
| R11 | Step |
| R12 | Step |
| R13 | Step |
| R14 | Step |
| R15 | Step |
| R2 | Step |
| R3 | Step |
| R4 | Step |
| R5 | Step |
| R6 | Step |
| R7 | Step |
| R8 | Step |
| R9 | Step |

APPENDIX-continued

List of reference designations:

| | |
|---|---|
| S1 | Process step |
| S2 | Process step |
| S2B | Process step |
| S2C | Process step |
| S3 | Process step |
| S30 | Process step |
| S300 | Process step |
| S301 | Process step |
| S302 | Process step |
| S303 | Process step |
| S30A | Process step |
| S31 | Process step |
| S32 | Process step |
| S33 | Process step |
| S34 | Process step |
| S35 | Process step |
| S36 | Process step |
| S37 | Process step |
| S3A | Process step |
| S3B | Process step |
| S3C | Process step |
| S4 | Process step |
| S40 | Process step |
| S4A | Process step |
| S4B | Process step |
| S4C | Process step |
| S5 | Process step |
| S6 | Process step |
| SM | Gas sensor module |
| V | Gas-measuring device |
| Z | Central unit |

What is claimed is:

1. A gas-measuring device comprising:
a gas sensor module;
a radio receiver unit;
a first radio transmitter unit;
a second radio transmitter unit;
an audio detection unit or an image detection unit or both an audio detection unit or an image detection unit; and
a control unit operatively connected to the gas sensor module and to the radio receiver unit and to the first radio transmitter unit and to the second radio receiver unit, wherein:
the control unit in a first operating state is configured to:
detect sensor data by means of the gas sensor module and to detect a potential hazardous state based on the sensor data; and
to change over into a second operating state when a hazardous state is detected; and
the control unit in the second operating state is configured to:
detect, by means of the radio receiver unit, one or more radio signals, which of the one or more radio signals indicate respective characteristics of portable transmitter units;
determine, based on the one or more radio signals, which of the portable transmitter units have a location with a sufficiently close proximity in space to the gas-measuring device; and
provide the characteristics of the transmitter units, determined to be located in the sufficiently close proximity, via the first radio transmitter unit;
the control unit being further configured to detect audio data or image data or both audio data and image data by means of the audio detection unit or the image detection unit both the audio detection unit and the image detection unit in the second operating state and to provide an output of the audio data or image data or both audio data and image data via the second radio transmitter unit.

2. The gas-measuring device in accordance with claim 1, wherein:
the respective radio signals indicate a respective transmission power, with which the respective radio signals were sent; and
the control unit is further configured to determine, based on the indicated transmission power, which of the portable transmitter units have a sufficiently close proximity in space to the gas-measuring device.

3. The gas-measuring device in accordance with claim 1, further comprising a data module for receiving data messages, wherein the control unit is further configured to receive one or more data messages, which indicate additional sensor data of another, external gas sensor module, by means of the data module, and to detect the potential hazardous state based on the additional sensor data.

4. The gas-measuring device in accordance with claim 1, further comprising a data module for receiving data messages, wherein the control unit is further configured to receive at least one alarm message, which indicates the possible presence of a hazardous state, by means of the data module, and to detect the potential hazardous state based on the alarm message.

5. The gas-measuring device in accordance with claim 1, further comprising an interface to the audio detection unit, wherein the control unit is further configured to:
detect audio data by means of the interface;
detect a presence of a predefined acoustic signal based on the audio data; and
detect a potential hazardous state in the presence of the predefined acoustic signal.

6. The gas-measuring device in accordance with claim 1, further comprising a data module for receiving data messages, wherein the control unit is further configured to:
receive an acknowledge message by means of the data module in the second operating state; and
end the second operating state in the presence of the acknowledge message.

7. The gas-measuring device in accordance with claim 1, further comprising an input unit for receiving predefined user input, wherein the control unit is further configured to end the second operating state in a presence of the predefined user input in the second operating state.

8. A gas-measuring device comprising:
a gas sensor module;
a radio receiver unit;
a first radio transmitter unit;
a second radio transmitter unit; and
a control unit operatively connected to the gas sensor module and to the radio receiver unit and to the first radio transmitter unit and to the second radio receiver unit, wherein:
the control unit in a first operating state is configured to:
detect sensor data by means of the gas sensor module and to detect a potential hazardous state based on the sensor data; and
to change over into a second operating state when a hazardous state is detected; and
the control unit in the second operating state is configured to:
detect, by means of the radio receiver unit, one or more radio signals, which of the one or more radio signals indicate respective characteristics of portable transmitter units;

determine, based on the one or more radio signals, which of the portable transmitter units have a location with a sufficiently close proximity in space to the gas-measuring device; and provide the characteristics of the transmitter units, determined to be located in the sufficiently close proximity, via the first radio transmitter unit;

the control unit being further configured to:

detect one or more radio signals, which indicate respective characteristics of the portable transmitter units at a first detection rate by means of the radio receiver unit in the first operating state; and detect one or more radio signals, which indicate respective characteristics of portable transmitter units at a second detection rate by means of the radio receiver unit, in the second operating state; and the second detection rate being higher than the first detection rate.

9. A gas-measuring device comprising:

a control unit;

a gas sensor module operatively connected to said control unit;

a detection unit operatively connected to said control unit, said detection unit being configured to detect features of a surrounding area, the features being separate from said gas sensor module;

a radio receiver unit operatively connected to said control unit, said radio receiver unit receiving radio signals from a portable transmitter unit, the radio signals indicate characteristics of the portable transmitter unit;

a first radio transmitter unit operatively connected to said control unit, said first radio transmitter unit transmitting the characteristics of the portable transmitter unit according to first transmission properties;

a second radio transmitter unit operatively connected to said control unit, said second radio transmitter unit transmitting the features from said detection unit according to second transmission properties, said second transmission properties being different from said first transmission properties;

said control unit having a first operating state configured to:

receive sensor data from said gas sensor module and to determine a potential hazardous state based on the sensor data;

to change over into a second operating state when a hazardous state is detected;

said control unit in said second operating state being configured to:

determine from the characteristics received from said radio receiver unit if the portable transmitter unit has a location within a predetermined proximity to the gas-measuring device;

selectively transmit the characteristics of the portable transmitter unit using said first radio transmitter unit;

separately transmit the features of the surrounding area from the detection unit using said second radio transmitter unit.

10. A gas-measuring device in accordance with claim 9, wherein:

the second transmission properties are less robust than the first transmission properties.

11. A gas-measuring device in accordance with claim 9, wherein:

the first transmission properties are configured to transmit at a higher importance and priority than the second transmission properties.

* * * * *